(12) United States Patent
Shankdhar et al.

(10) Patent No.: US 11,769,092 B1
(45) Date of Patent: Sep. 26, 2023

(54) SYSTEM AND METHOD OF SEGMENTED MODELLING FOR CAMPAIGN PLANNING IN A VERY LARGE-SCALE SUPPLY CHAIN NETWORK

(71) Applicant: Blue Yonder Group, Inc., Scottsdale, AZ (US)

(72) Inventors: Ankit Shankdhar, Haridwar (IN); Arijit Deb, Bangalore (IN); Chaitanya Pai Kalasa Gopinath, Bangalore (IN); Devender Pal Singh Chauhan, Bangalore (IN); Tushar Shekhar, Katihar (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 69 days.

(21) Appl. No.: 15/968,352

(22) Filed: May 1, 2018

(51) Int. Cl.
| | |
|---|---|
| *G06Q 10/0631* | (2023.01) |
| *G06Q 10/087* | (2023.01) |
| *G06Q 30/0202* | (2023.01) |
| *G06Q 10/04* | (2023.01) |
| *G06Q 10/067* | (2023.01) |
| *G06N 5/01* | (2023.01) |

(52) U.S. Cl.
CPC ......... *G06Q 10/06315* (2013.01); *G06N 5/01* (2023.01); *G06Q 10/04* (2013.01); *G06Q 10/067* (2013.01); *G06Q 10/06316* (2013.01); *G06Q 10/087* (2013.01); *G06Q 30/0202* (2013.01)

(58) Field of Classification Search
CPC ............. G06Q 10/06315; G06Q 10/04; G06Q 10/06316; G06Q 10/067; G06Q 10/087; G06Q 30/0202; G06N 5/003

USPC ........................................................ 705/7.25
See application file for complete search history.

(56) References Cited

U.S. PATENT DOCUMENTS

| | | | | |
|---|---|---|---|---|
| 8,965,548 | B1 * | 2/2015 | Kamath | G06Q 10/06315 700/100 |
| 9,008,827 | B1 * | 4/2015 | Dwarakanath | F25B 27/00 700/214 |
| 10,380,524 | B1 * | 8/2019 | Raymond | G06Q 10/06315 |

(Continued)

OTHER PUBLICATIONS

The impact of supply chain integration on performance: A contingency and configuration approach; Flynn et al.; The Journal of Operations Management. (Year: 2010).*

*Primary Examiner* — Timothy Padot
*Assistant Examiner* — Francis Z. Santiago Merced
(74) *Attorney, Agent, or Firm* — Spencer Fane LLP; Steven J. Laureanti

(57) ABSTRACT

A system and method are disclosed including a planner having a processor and memory. The planner models a supply chain network over a planning horizon having one or more time buckets and a production line to produce one or more products using one or more campaign operations and one or more campaignable resources. The planner further formulates a supply chain master planning problem comprising a hierarchy of objective functions and one or more constraints and segments a campaign planning problem into three stages. The planner solves a first stage to determine prioritized production demands on campaignable buffers, solves a second stage to determine a timing and a sequence for allocating campaignable resources to campaignable buffers, and solves a third stage to determine a quantity of products to produce on campaignable resources.

18 Claims, 8 Drawing Sheets

(56) References Cited

U.S. PATENT DOCUMENTS

| | | | |
|---|---|---|---|
| 2008/0228604 A1* | 9/2008 | Von Helmolt | G06Q 20/20 |
| | | | 705/29 |
| 2010/0114667 A1* | 5/2010 | Singh | G06Q 10/063 |
| | | | 705/7.11 |
| 2017/0017909 A1* | 1/2017 | Srinivasan | G06Q 10/06375 |
| 2019/0220804 A1* | 7/2019 | Musunuri | B65G 1/10 |

* cited by examiner

| Oblevel | Meaning | Single Stage | Segmented | Verdict |
|---|---|---|---|---|
| amt_not_satisfied[layer(Layer4) + band(1)] | Demand Sat | -363 | -363 | Same |
| backlog[layer(Layer4) + band(1)] | Lateness | 484 | 484 | Same |
| op_earliness | Total Build Ahead | 255398 | 255041 | Equivalent |
| total_op_plans | Total Mfg Qty | 255398 | 255041 | Equivalent |

Single Stage

Layer Layer4: Total demand 363;
Satisfied 363;
Requests 2;   Late 1;   Short 0;
Total days late from target 2;
Average lateness 2;
Max days late 2 from target
Wgt'd lateness 484;   Avg wgt'd lateness 484

Segmented

Layer Layer4: Total demand 363;
Satisfied 363;
Requests 2;   Late 1;   Short 0;
Total days late from target 2;
Average lateness 2;
Maximum days late 2 from target
Weighted lateness 484;
Average weighted lateness 484

|  | SUMMARY | |
|---|---|---|
|  | Single Stage | Segmented Planning |
| TOTAL DEMAND | 174,126,942 | 174,126,942 |
| SHORT QUANTITY | 17,506,801 | 20,010,175 |
| DEMAND SATISFACTION | 89.95% | 88.51% |
| TOTAL RUN TIME | ~144 hours | ~26 hours |
| RAM USAGE | ~132GB Full Time | ~53GB for first 7 hours<br>~6GB for next 2 hours<br>~90GB for 18 hours |

| COMPARISON BY DEMAND LAYERS | | | | | | |
|---|---|---|---|---|---|---|
|  |  | Single Stage | | | Segmented Planning | |
| Layer | Demand | Short | fullFill% |  | Short | fullFill% |
| Layer0 | 170,604 | 1,206 | 99.29% |  | 1,227 | 99.28% |
| Layer1 | 16,552,067 | 1,121,171 | 93.23% |  | 1,284,325 | 92.24% |
| Layer2 | 1,248,996 | 16,061 | 98.71% |  | 34,232 | 97.26% |
| Layer3 | 1,557,528 | 613,609 | 60.60% |  | 747,701 | 51.99% |
| Layer4 | 8,780,709 | 558,508 | 93.64% |  | 587,141 | 93.31% |
| Layer5 | 522,620 | 125,707 | 75.95% |  | 130,985 | 74.94% |
| Layer6 | 244 | - | 100.00% |  | - | 100.00% |
| Layer7 | 23,839,410 | 1,044,218 | 95.62% |  | 1,423,722 | 94.03% |
| Layer8 | 1,435,866 | 304,876 | 78.77% |  | 334,492 | 76.70% |
| Layer9 | 937,897 | 302,187 | 67.78% |  | 340,395 | 63.71% |
| Layer10 | 3,091,379 | 736,751 | 76.17% |  | 986,864 | 68.08% |
| Layer11 | 41,485,672 | 4,264,949 | 89.72% |  | 4,680,750 | 88.72% |
| Layer12 | 20,091,626 | 2,133,827 | 89.38% |  | 2,340,950 | 88.35% |
| Layer13 | 54,412,324 | 6,283,732 | 88.45% |  | 7,117,394 | 86.92% |
| SUMMARY | 174,126,942 | 17,506,801 | 89.95% |  | 20,010,175 | 88.51% |

FIG. 8

SYSTEM AND METHOD OF SEGMENTED MODELLING FOR CAMPAIGN PLANNING IN A VERY LARGE-SCALE SUPPLY CHAIN NETWORK

TECHNICAL FIELD

The present disclosure relates generally to supply chain planning and specifically to a system and method of segmented campaign planning.

BACKGROUND

A supply chain for manufactured items typically involves the procurement of raw materials, transforming the raw materials into finished goods, and distributing the finished goods to warehouses, retailers, and customers. A supply chain planner determines the flow and distribution of items in the supply chain to meet a demand for the finished goods, while ensuring compliance with any other business objectives and constraints. Determining the solution is complicated by the fact that there is often a trade-off between inventory and production changeover. For example, producing long runs of a particular product line may decrease changeovers, but it may undesirably increase inventory levels of finished goods or works in progress for a given time frame. In some cases, high inventory is undesirable, for example, because freshness or storage space is a constraint. Further, as one line is produced on a resource for a longer time in order to reduce production changeover, another product, which may have a high demand and low inventory, cannot be simultaneously produced on the same resource. Thus, there are trade-offs between inventory and production changeover that must be taken into account. To determine the proper allocation of these campaignable resources, a supply chain planner may use one or more linear programming (LP) or heuristics solvers to generate a solution. However, previous solutions require a large amount of computing resources, and, even then, require many days to run, are unstable, and fail quickly in the presence of imperfect data. This inability to determine the proper allocation of campaignable resources quickly for large supply chains in undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 7 illustrates a comparison of results for single stage campaign planning and segmented campaign planning for a small production dataset; and FIG. 8 illustrates a comparison of results for single stage campaign planning and segmented campaign planning for a large production dataset.

DETAILED DESCRIPTION

Figure 1:
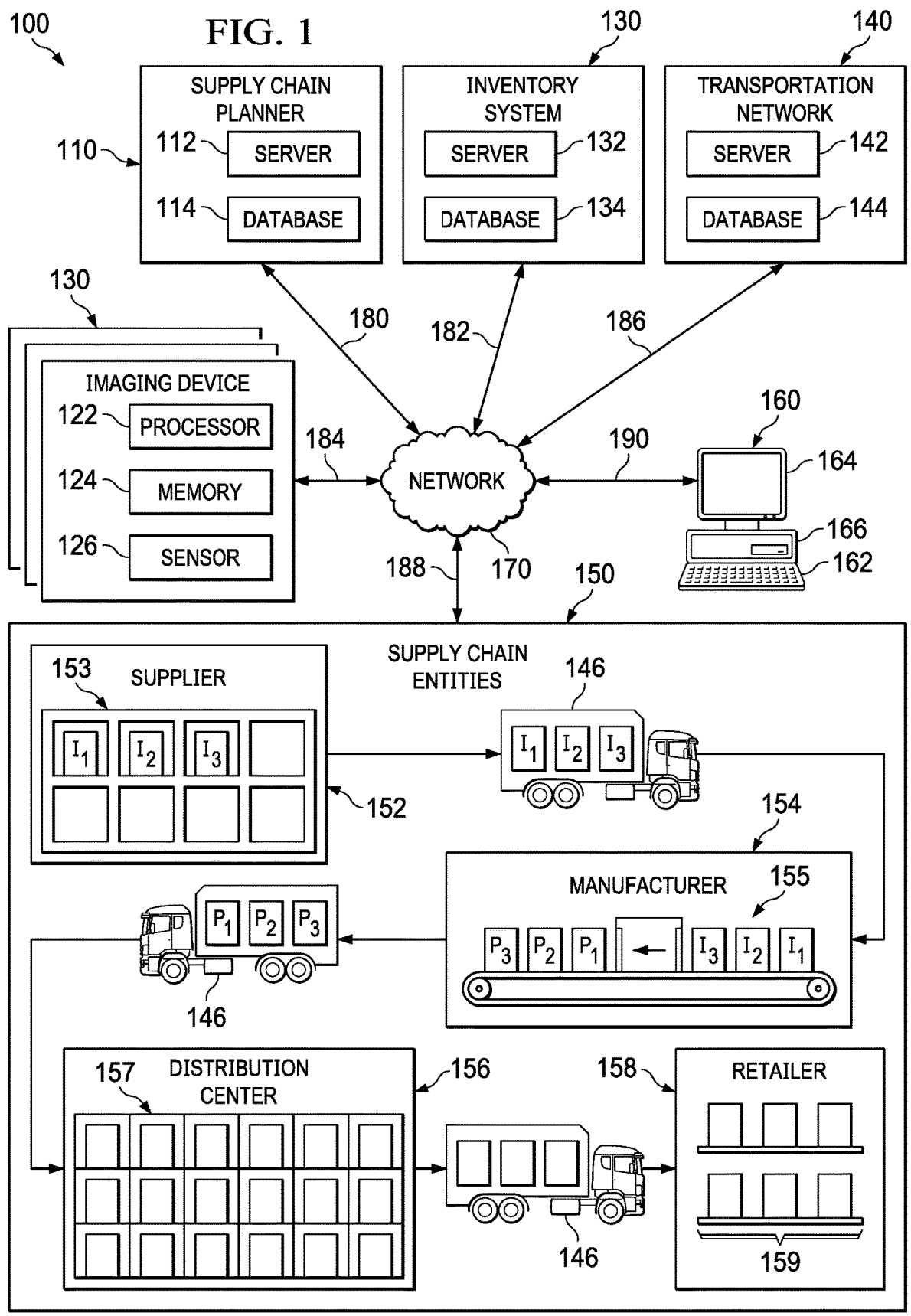
FIG. 1 illustrates a supply chain planner, according to an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Supply chain networks for the manufacture of items often comprise one or more resources that require a non-trivial amount of time to be retasked from the production of a first item to the production of a second item. These may be termed campaignable resources. By way of example only and not by way of limitation, campaignable resources include soft drink bottling machinery (which bottles many flavors of drinks into various bottle sizes), tire manufacturing equipment (which produces various types and styles of tires), and toy manufacturing equipment (which uses interchangeable molds to produce many types of toys). According to embodiments, planning the sequence and allocation of campaignable resources in a supply chain plan may be termed campaign planning.

Because campaignable resources often comprise lengthy changeovers that are sequence-dependent, if they are not accounted for during planning, the plan becomes infeasible during scheduling. As a result, backlog or shortage is increased. On the other hand, if changeovers are accounted for during master planning, it leads to discrete constraints, changing the problem structure from a linear program (LP) to a mixed integer program (MIP) and (in some cases) to mixed integer nonlinear program (MINLP). Though there are methods for solving each of these problems on a small scale, there is no method for solving large scale campaign planning problems efficiently. As an example only and not by way of limitation, a linear programming-based solver, such as, for example, linear programming optimization planning (LPOPT) solver is not scalable for large datasets, such as global supply chains having many production plants and a large number of finished products. For these types of supply chains, a typical solution may require computing resources with 250 GB or RAM and a solve time over 140 hours. Additionally, these solutions are often unstable and, combined with the long solve time, cannot be used for weekly planning.

As described in more detail below, embodiments of the current disclosure comprise linear optimization supply chain planning with segmented campaign planning that uses less computing resources and more quickly plans campaignable resources inside of a master planning process than non-segmented campaign planning while, at the same time, generating plans with equal quality for small datasets and business-validated plan quality with a significant decrease in runtime for large datasets FIG. 1 illustrates exemplary supply chain network 100 according to an embodiment. Supply chain network 100 comprises supply chain planner 110, one or more imaging devices 120, inventory system 130, transportation network 140, one or more supply chain entities 150, computer 160, network 170, and communication links 180-190. Although a single supply chain planner 110, one or more imaging devices 120, a single inventory system 130, a single transportation network 140, one or more supply chain entities 150, a single computer 160, and a single network 170, are shown and described, embodiments contemplate any number of supply chain planners, imaging devices, inventory systems, transportation systems, supply chain entities, computers, or networks, according to particular needs.

In one embodiment, supply chain planner 110 provides for campaign planning within master planning. Supply chain planner 110 solves a LP problem using a segmented approach to campaign planning, such that, the solution in a given circumstance is arrived at by solving three segmented campaign planning problems to generate a solution much faster than a single optimization problem. In one embodiment, supply chain planner 110 comprises server 112 and database 114. According to embodiments, server 112 comprises one or more modules that model a supply chain network, formulate a supply chain planning problem, identify campaignable resources, segment the supply chain network into at least three stages, and formulate and solve a series of segmented campaign planning problems. In an embodiment, supply chain planner 110 stores supply chain data of one or more supply chain entities 150 of supply chain network 100 in database 114.

As an example only and not by way of limitation, supply chain network 100 may be a global tire manufacturer and distributor, such as a tire manufacturer supply chain network 100 and may comprise a large number of different items, such as, for example, over 22,000 different items, (each represented by a different SKU) that can be produced at one of over a dozen manufacturing plants (manufacturers 154) worldwide. A global transportation network 140 may then transport the produced tires to meet demand for customers, distribution centers, and stocking locations all over the world. Determining the best supply chain plan for a global supply chain quickly becomes a very large problem requiring capturing the global demand and ensuring all of these demands are met in an efficient manner, while respecting all constraints and objectives.

As an example only and not by way of limitation, one of the most difficult parts of supply chain planning in the tire industry is campaign planning the sequence of tire production during the curing process. The curing process receives green tires from upstream manufacturing facilities and places the green tires in SKU-specific molds where the tires are molded and cured before distribution downstream for further processing and distribution. Each mold comprises a number of different components, such as, for example, a tread ring, a bead ring top, a bead ring bottom, a sidewall top, a sidewall bottom and only produces a limited number of different types of tires, but demand requires producing many different sizes and types of tires to match the enormous variety of automobiles. Therefore, the tire molds must be changed frequently during tire production. However, changing molds is non-trivial—the changeover requires assembling five separate main components and consumes a substantial amount of time, such as, for example, four to five hours, and due to these constraints only a limited number of molds can be changed. The curing process may be optimized using campaign planning, but solving the campaign planning problem is complicated by the depth and breadth of supply chain network 100, the different modes that the tires may be transported across the globe to meet demand, and other factors described herein. For example, when using a LPOPT solver, a solution for the tire manufacturer supply chain network requires approximately 120-130 hours. As described in more detail below, the one or more engines and solvers of supply chain planner 110 may solve the same problem in approximately 25-26 hours while producing a solution with demand satisfaction the same or equivalent to the LPOPT solver.

By way of a further example only and not by way of limitation, in the case of a beverage manufacturer and distributor, the beverage may be manufactured in various containers (such as, for example, a bottle (glass, plastic, cardboard container, can, or the like). The containers may be of different sizes, such as, for example, 330 ml, 500 ml, or 1000 ml, and the changeover times may be sequence dependent and vary from a few hours to several days or longer. Additionally, the bottling of different flavors (such as, for example, cola, lemon, orange, and the like) may also be sequence dependent (for example, in an embodiment mild flavor to strong flavor is a preferred sequence) and involves setup times, which are typically less than the earlier setup times. Moreover, bottling may comprise upstream constraints (such as, for example, syrup storage tanks), which favor running the bottling line for at least one shift. Other constraints (such as, for example, shelf life criteria, freshness, and the like), require that beverages not remain in the supply chain for more than a predetermined amount of time, such as, for example, a particular number of days, weeks, months, or other like time periods.

In one embodiment, supply chain network 100 considers various discrete constraints, such as, for example, sequence-dependent setup times, lot-sizing, storage, and shelf-life constraints of one or more supply chain entities 150 when solving supply chain campaign planning problems. As described below in more detail, these various discrete constraints, such as, for example, sequence-dependent setup times, lot-sizing, storage, and shelf-life constraints may prevent one or more supply chain entities 150 from satisfying supply chain demand and may delay supply chain demand from being satisfied during a particular planning horizon. Although, an exemplary supply chain network 100 is described as associated with a tire manufacturer supply chain network 100, embodiments contemplate a beverage bottling supply chain network, a toy manufacturing supply chain network, and/or another like supply chain network for any industry that may solve supply chain campaign planning problems of any number of supply chain entities 150, according to particular needs.

One or more imaging devices 120 comprise one or more processors 122, memory 124, one or more sensors 126, and may include any suitable input device, output device, fixed or removable computer-readable storage media, or the like. According to embodiments, one or more imaging devices 120 comprise an electronic device that receives imaging data from one or more sensors 126 or from one or more databases in supply chain network 100. One or more sensors 126 of one or more imaging devices 120 may comprise an imaging sensor, such as, a camera, scanner, electronic eye, photodiode, charged coupled device (CCD), or any other electronic component that detects visual characteristics (such as color, shape, size, fill level, or the like) of objects. One or more imaging devices 120 may comprise, for example, a mobile handheld electronic device such as, for example, a smartphone, a tablet computer, a wireless communication device, and/or one or more networked electronic devices configured to image items using sensor 126 and transmit product images to one or more databases.

In addition, or as an alternative, one or more sensors 126 may comprise a radio receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like objects that encode identifying information. One or more imaging devices 120 may generate a mapping of one or more items in the supply chain network 100 by scanning an identifier or object associated with an item and identifying the item based, at least in part, on the scan. This may include, for example, a stationary scanner located at one or more supply chain entities 150 that scans items as the items pass near the scanner. As explained in more detail below, supply chain planner 110, one or more imaging devices 120, inventory system 130, and transportation network 140 may use the mapping of an item to locate the item in supply chain network 100.

Additionally, one or more sensors 126 of one or more imaging devices 120 may be located at one or more locations local to, or remote from, the one or more imaging devices 120, including, for example, one or more sensors 126 integrated into one or more imaging devices 120 or one or more sensors 126 remotely located from, but communicatively coupled with, one or more imaging devices 120. According to some embodiments, one or more sensors 126 may be configured to communicate directly or indirectly with one or more of supply chain planner 110, one or more imaging devices 120, inventory system 130, transportation network 140, one or more supply chain entities 150, computer 160, and/or network 170 using one or more communication links 180-190.

Inventory system 130 comprises server 132 and database 134. Server 132 of inventory system 130 is configured to receive and transmit item data, including item identifiers, pricing data, attribute data, inventory levels, and other like data about one or more items at one or more locations in the supply chain network 100. Server 132 stores and retrieves item data from database 144 or from one or more locations in supply chain network 100.

Transportation network 140 comprises server 142 and database 144. According to embodiments, transportation network 140 directs one or more transportation vehicles 146 to ship one or more items between one or more supply chain entities 150, based, at least in part, on a supply chain plan, including a supply chain master plan and/or a campaign plan, the number of items currently in stock at one or more supply chain entities 150, the number of items currently in transit in the transportation network 140, forecasted demand, a supply chain disruption, and/or one or more other factors described herein. Transportation vehicles 146 comprise, for example, any number of trucks, cars, vans, boats, airplanes, unmanned aerial vehicles (UAVs), cranes, robotic machinery, or the like. Transportation vehicles 146 may comprise radio, satellite, or other communication that communicates location information (such as, for example, geographic coordinates, distance from a location, global positioning satellite (GPS) information, or the like) with supply chain planner 110, one or more imaging devices 120, inventory system 130, transportation network 140, and/or one or more supply chain entities 150 to identify the location of the transportation vehicle 146 and the location of any inventory or shipment located on the transportation vehicle 146.

As shown in FIG. 1, supply chain network 100 comprising supply chain planner 110, one or more imaging devices 120, inventory system 130, transportation network 140, and one or more supply chain entities 150 may operate on one or more computers 160 that are integral to or separate from the hardware and/or software that support supply chain planner 110, one or more imaging devices 120, inventory system 130, transportation network 140, and one or more supply chain entities 150. Computers 160 may include any suitable input device 162, such as a keypad, mouse, touch screen, microphone, or other device to input information. Output device 164 may convey information associated with the operation of supply chain network 100, including digital or analog data, visual information, or audio information. Computer 160 may include fixed or removable computer-readable storage media, including a non-transitory computer readable medium, magnetic computer disks, flash drives, CD-ROM, in-memory device or other suitable media to receive output from and provide input to supply chain network 100.

Computer 160 may include one or more processors 166 and associated memory to execute instructions and manipulate information according to the operation of supply chain network 100 and any of the methods described herein. In addition, or as an alternative, embodiments contemplate executing the instructions on computer 160 that cause computer 160 to perform functions of the method. Further examples may also include articles of manufacture including tangible non-transitory computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from supply chain planner 110, one or more imaging devices 120, inventory system 130, transportation network 140, and one or more supply chain entities 150. In addition, each of the one or more computers 160 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with the inventory planner 110, one or more imaging devices 120, inventory system 130, transportation network 140, and one or more supply chain entities 150. These one or more users may include, for example, a "manager" or a "planner" handling supply chain planning, campaign planning, and/or one or more related tasks within the system. In addition, or as an alternative, these one or more users within the system may include, for example, one or more computers programmed to autonomously handle, among other things, one or more supply chain processes such as demand planning, supply and distribution planning, inventory management, allocation planning, order fulfilment, adjustment of manufacturing and inventory levels at various stocking points, and/or one or more related tasks within supply chain network 100.

One or more supply chain entities 150 represent one or more supply chain networks, including one or more enterprises, such as, for example networks of one or more suppliers 152, manufacturers 154, distribution centers 156, retailers 158 (including brick and mortar and online stores), customers, and/or the like. Suppliers 152 may be any suitable entity that offers to sell or otherwise provides one or more items (i.e., materials, components, or products) to one or more manufacturers 154. Suppliers 152 may comprise automated distribution systems 153 that automatically transport products to one or more manufacturers 154 based, at least in part, on a supply chain plan, including a supply chain master plan and/or a campaign plan, the number of items currently in stock at one or more supply chain entities 150, the number of items currently in transit in the transportation network 140, forecasted demand, a supply chain disruption, and/or one or more other factors described herein.

Manufacturers 154 may be any suitable entity that manufactures at least one product. Manufacturers 154 may use one or more items during the manufacturing process to produce any manufactured, fabricated, assembled, or otherwise processed item, material, component, good, or product. In one embodiment, a product represents an item ready to be supplied to, for example, one or more supply chain entities 150 in supply chain network 100, such as retailers 158, an item that needs further processing, or any other item. Manufacturers 154 may, for example, produce and sell a product to suppliers 152, other manufacturers 154, distribution centers 156, retailers 158, a customer, or any other suitable person or entity. Manufacturers 154 may comprise automated robotic production machinery 155 that produce products based, at least in part, on a supply chain plan, including a supply chain master plan and/or a campaign plan, the number of items currently in stock at one or more supply chain entities 150, the number of items currently in transit in the transportation network 140, forecasted demand, a supply chain disruption, and/or one or more other factors described herein.

Distribution centers 156 may be any suitable entity that offers to store or otherwise distribute at least one product to one or more retailers 158 and/or customers. Distribution centers 156 may, for example, receive a product from a first one or more supply chain entities 150 in supply chain network 100 and store and transport the product for a second one or more supply chain entities 150. Distribution centers 156 may comprise automated warehousing systems 157 that automatically remove products from and place products into inventory based, at least in part, on a supply chain plan, including a supply chain master plan and/or a campaign plan, the number of items currently in stock at one or more supply chain entities 150, the number of items currently in transit in the transportation network 140, forecasted demand, a supply chain disruption, and/or one or more other factors described herein.

Retailers 158 may be any suitable entity that obtains one or more products to sell to one or more customers. Retailers 158 may comprise any online or brick-and-mortar store, including stores with shelving systems 159. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of retailers 158 based on computer-generated instructions or automatically by machinery to place products in a desired location in retailers 158 and which may be based, at least in part, on a supply chain plan, including a supply chain master plan and/or a campaign plan, the number of items currently in stock at one or more supply chain entities 150, the number of items currently in transit in the transportation network 140, forecasted demand, a supply chain disruption, and/or one or more other factors described herein.

Although one or more supply chain entities 150 are shown and described as separate and distinct entities, the same entity may simultaneously act as any one of the one or more supply chain entities 150. For example, one or more supply chain entities 150 acting as a manufacturer can produce a product, and the same one or more supply chain entities 150 can act as a supplier to supply an item to itself or another one or more supply chain entities 150. Although one example of a supply chain network 100 is shown and described, embodiments contemplate any configuration of supply chain network 100, without departing from the scope described herein.

In one embodiment, supply chain planner 110 may be coupled with network 170 using communications link 180, which may be any wireline, wireless, or other link suitable to support data communications between supply chain planner 110 and network 170 during operation of supply chain network 100. One or more imaging devices 120 may be coupled with network 170 using communications link 182, which may be any wireline, wireless, or other link suitable to support data communications between one or more imaging devices 120 and network 170 during operation of supply chain network 100. Inventory system 130 may be coupled with network 170 using communications link 184, which may be any wireline, wireless, or other link suitable to support data communications between inventory system 130 and network 170 during operation of supply chain network 100. Transportation network 140 may be coupled with network 170 using communications link 186, which may be any wireline, wireless, or other link suitable to support data communications between transportation network 140 and network 170 during operation of supply chain network 100. One or more supply chain entities 150 may be coupled with network 170 using communications link 188, which may be any wireline, wireless, or other link suitable to support data communications between one or more supply chain entities 150 and network 170 during operation of supply chain network 100. Computer 160 may be coupled with network 170 using communications link 190, which may be any wireline, wireless, or other link suitable to support data communications between computer 160 and network 170 during operation of supply chain network 100.

Although communication links 180-190 are shown as generally coupling supply chain planner 110, one or more imaging devices 120, inventory system 130, transportation network 140, one or more supply chain entities 150, and computer 160 to network 170, any of supply chain planner 110, one or more imaging devices 120, inventory system 130, transportation network 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling supply chain planner 110, one or more imaging devices 120, inventory system 130, transportation network 140, one or more supply chain entities 150, and computer 160. For example, data may be maintained locally to, or externally of, supply chain planner 110, one or more imaging devices 120, inventory system 130, transportation network 140, one or more supply chain entities 150, and computer 160 and made available to one or more associated users of supply chain planner 110, one or more imaging devices 120, inventory system 130, transportation network 140, one or more supply chain entities 150, and computer 160 using network 170 or in any other appropriate manner. For example, data may be maintained in a cloud database at one or more locations external to supply chain planner 110, one or more imaging devices 120, inventory system 130, transportation network 140, one or more supply chain entities 150, and computer 160 and made available to one or more associated users of supply chain planner 110, one or more imaging devices 120, inventory system 130, transportation network 140, one or more supply chain entities 150, and computer 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, supply chain planner 110 may generate a supply chain plan, including a supply chain master plan and/or a campaign plan. Furthermore, supply chain planner 110 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities, and the configuration and quantity of packaging and shipping of items based on a supply chain plan, including a supply chain master plan and/or a campaign plan, the number of items currently in the inventory one or more supply chain entities 150, the number of items currently in transit in the transportation network 140, forecasted demand, a supply chain disruption, and/or one or more other factors described herein. For example, the methods described herein may include computers 160 receiving product data 212 (FIG. 2) from automated machinery having at least one sensor and product data 212 corresponding to an item detected by the automated machinery. The received product data 212 may include an image of the item, an identifier (such as a SKU), as described above, and/or other product information associated with the item (dimensions, texture, estimated weight, fill level, and the like). The method may further include computers 160 looking up the received product data 212 in a database system associated with supply chain planner 110 to identify the item corresponding to the product data 212 received from the automated machinery.

Computers 170 may also receive, from one or more sensors 126 of the one or more imaging devices, a current location of the identified item. Based on the identification of the item, computers 160 may also identify (or alternatively generate) a first mapping in the database system, where the first mapping is associated with the current location of the identified item. Computers 160 may also identify a second mapping in the database system, where the second mapping is associated with a past location of the identified item. Computers 160 may also compare the first mapping and the second mapping to determine if the current location of the identified item in the first mapping is different than the past location of the identified item in the second mapping. Computers 160 may then send instructions to the automated machinery based, as least in part, on one or more differences between the first mapping and the second mapping such as, for example, to locate items to add to or remove from an inventory of or package for one or more supply chain entities 150.

Figure 2:
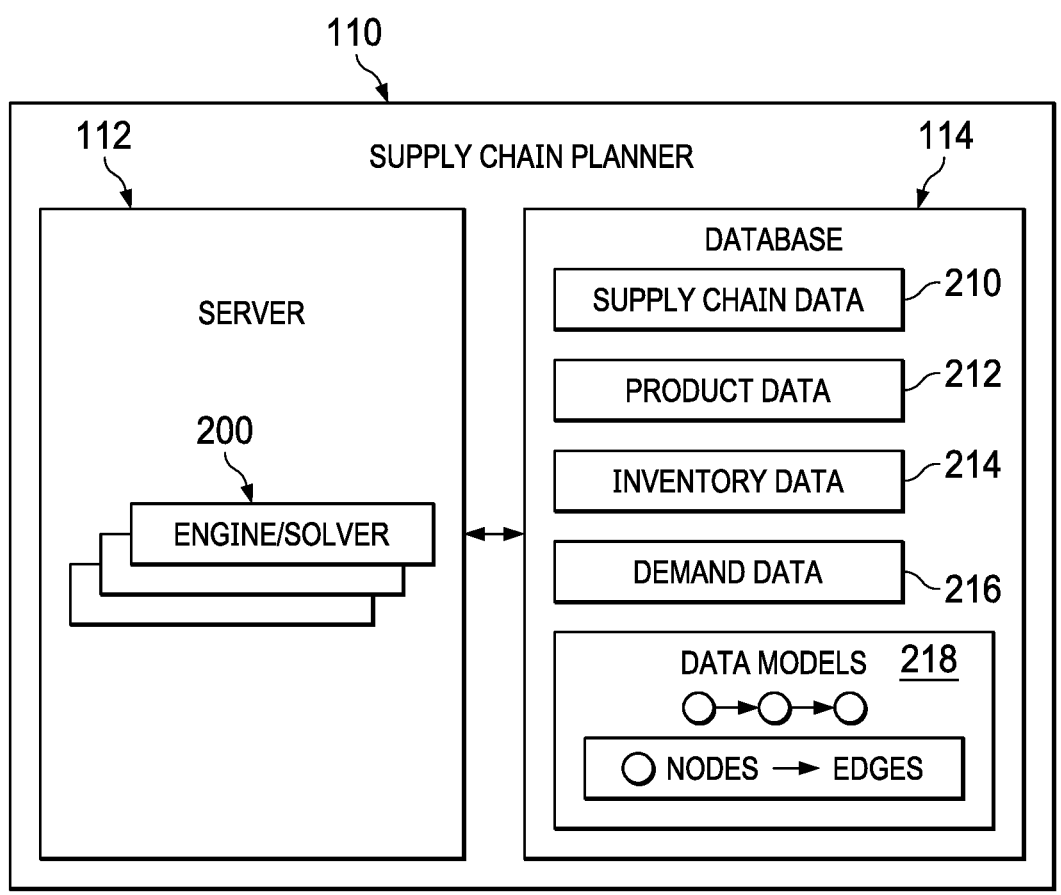
FIG. 2 illustrates the supply chain planner of FIG. 1 in greater detail, according to an embodiment.

FIG. 2 illustrates supply chain planner 110 of FIG. 1 in greater detail, according to an embodiment. As discussed above, supply chain planner 110 may comprise server 112 and database 114. Although supply chain planner 110 is shown as comprising a single server 112 and a single database 114, embodiments contemplate any suitable number of servers or databases internal to or externally coupled with supply chain planner 110.

Server 112 of supply chain planner 110 may comprise one or more engines or solvers 200 for generating an optimized solution and/or plan of supply chain campaign planning problems of supply chain network 100. The one or more engines or solvers 200 may solve the segmented campaign planning problems of a supply chain master planning problem using the results of a previous segmented campaign planning problem and data manipulations performed between planning problems. In an embodiment, supply chain planner 110 stores and retrieves supply chain master planning problem data, such as, for example, Linear Programming (LP) optimized plans of supply chain network 100 in database 114. In addition, although server 112 is shown and described as comprising one or more engines or solvers 200, embodiments contemplate any suitable number or combination of engines and/or solvers, according to particular needs.

As discussed in more detail below, solver 200 models one or more supply chain master planning problems of supply chain network 100. That is, solver 200 of server 112 models the one or more supply chain master planning problems of one or more supply chain entities 150 to represent the flow of materials through supply chain network 100. In addition, supply chain network 100, including the one or more supply chain master planning problems, is valid for a particular period of interest, i.e., a planning horizon.

Database 114 comprises one or more databases or other data storage arrangements at one or more locations, local to, or remote from, server 112. Database 114 includes, for example, supply chain data 210, product data 212, inventory data 214, demand data 216, and data models 218. Although, database 114 is shown and described as comprising supply chain data 210, product data 212, inventory data 214, demand data 216, and data models 218, embodiments contemplate any suitable arrangement or combination of data storage, located at one or more locations, local to, or remote from, supply chain planner 110, according to particular needs.

As an example only and not by way of limitation, database 114 stores supply chain data 210, including one or more supply chain master planning problems of supply chain network 100 that may be used by server 112, and/or solver 200. Supply chain data 210 may comprise for example, various decision variables, business constraints, goals and objectives of one or more supply chain entities 150. According to some embodiments, supply chain data 210 may comprise hierarchical objectives specified by, for example, business rules, campaign data, master planning requirements along with scheduling constraints and discrete constraints, such as, for example, sequence dependent setup times, lot-sizing, storage, shelf life, and other like constraints.

Product data 212 of database 114 may comprise one or more data structures for identifying, classifying, and storing data associated with products, including, for example, a product identifier (such as a Stock Keeping Unit (SKU), Universal Product Code (UPC) or the like), product attributes and attribute values, sourcing information, and the like. Product data 210 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, fill level, color, and the like).

Inventory data 214 of database 114 may comprise any data relating to current or projected inventory quantities or states. According to embodiments, inventory data 214 may comprise the current level of inventory for items at one or more stocking points across supply chain network 100. In addition, inventory data 214 may comprise order rules that describe one or more rules or limits on setting an inventory policy, including, but not limited to, a minimum order quantity, a maximum order quantity, a discount, a step-size order quantity, and batch quantity rules. According to some embodiments, supply chain planner 110 accesses and stores inventory data 214 in database 114, which may be used by supply chain planner 110 to place orders, set inventory levels at one or more stocking points, initiate manufacturing of one or more components, or the like. In addition, or as an alternative, inventory data 214 may be updated by receiving current item quantities, mappings, or locations from one or more imaging devices 120, inventory system 130, transportation system 140, and/or one or more supply chain entities 150.

Demand data 216 of database 114 may comprise, for example, any data relating to past sales, past demand, and purchase data of one or more supply chain entities 150. Demand data 216 may be stored at time intervals such as, for example, by the minute, hour, daily, weekly, monthly, quarterly, yearly, or any suitable time interval, including substantially in real time. According to embodiments, demand data 216 may include historical demand or projected demand forecasts for one or more retail locations, customers, regions, or the like of one or more supply chain entities 150 and may include product attribute demand or forecasts.

Data models 218 represent the flow of materials through one or more supply chain entities 150 of supply chain network 100 for one or more supply chain master planning problems having at least one campaignable resource. Solver 200 may model the flow of materials through one or more supply chain entities 150 of supply chain network 100 as data models 218 comprising a network of nodes and edges. The material storage and/or transition units are modeled as nodes, which may be referred to as, for example, buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modeled as edges connecting the nodes. Each edge may represent the flow, transportation, or assembly of materials (such as items or resources) between the nodes by, for example, production processing or transportation. A planning horizon for the data models 218 may be broken down into elementary time-units, such as, for example, time-buckets, or, simply, buckets. The edge between two buffer nodes denote processing of material and the edge between different buckets for the same buffer indicates inventory carried forward. Flow-balance constraints for most, if not every buffer in every bucket, model the material movement in supply chain network 100.

Figure 3:
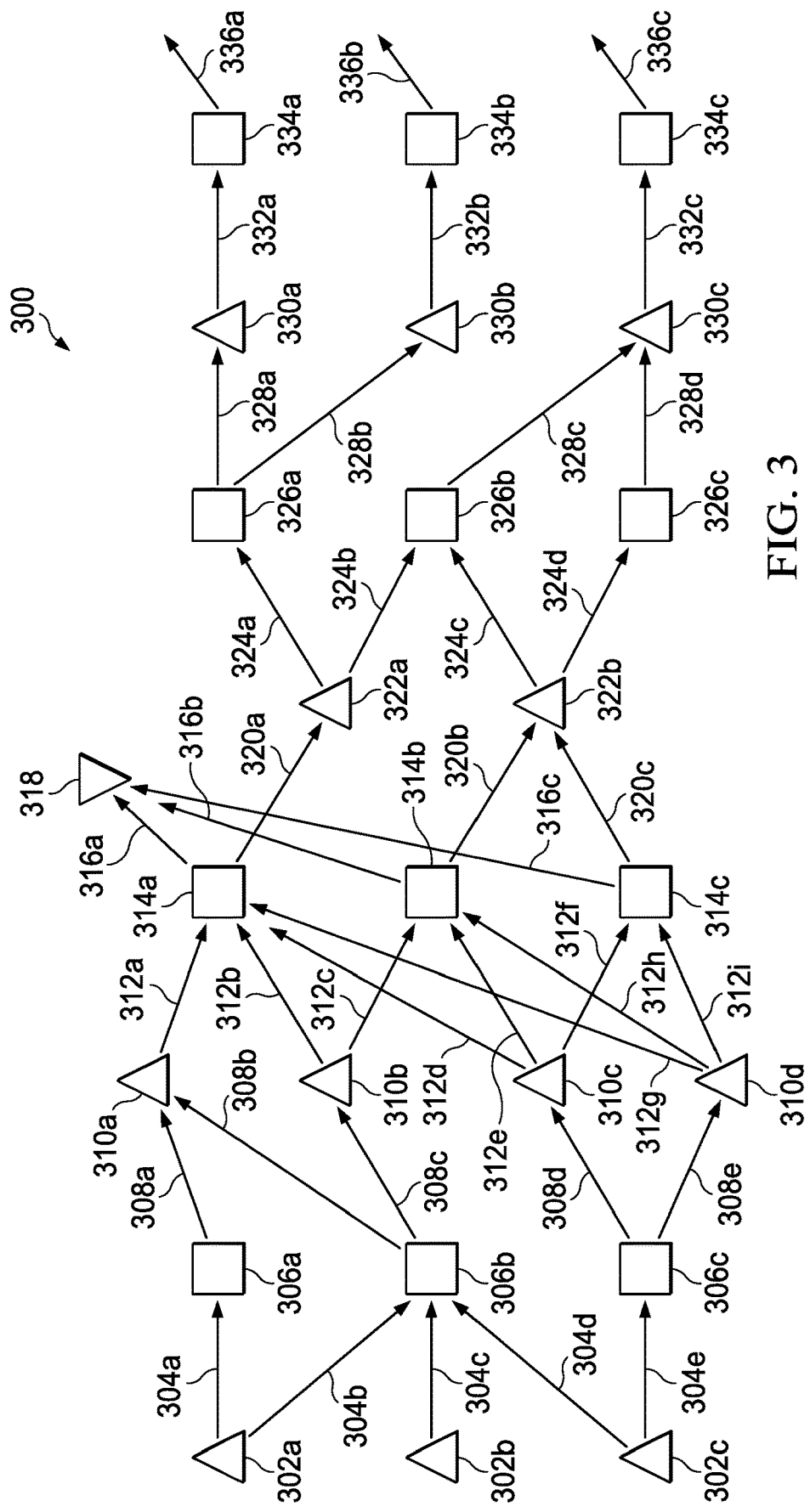
FIG. 3 illustrates a supply chain network model, according to an embodiment.

FIG. 3 comprises an exemplary supply chain network model 300, according to an embodiment. In the exemplary supply chain network model 300, materials flow from upstream nodes to downstream nodes along each of the edges from left to right from raw materials to finished products. However, flows may be bidirectional, and one or more materials may flow from right to left, from a downstream node to an upstream node. Supply chain network represented by supply chain network model 300 begins at the most upstream nodes representing raw material buffers 302a-302c. Raw material buffers 302a-302c may receive the initial input for a manufacturing process. For example, in a tire manufacturer supply chain network, raw materials may comprise rubber, metal and fabric layers, adhesives, polymers, and other materials and compounds required for tire manufacturing. The flow of raw materials is indicated by edges 304a-304e, which identify which of upstream production processes 306a-306c is a possible destination for raw materials from raw material buffers 302a-302c. For example, raw materials from first raw material buffer 302a may be transported to either first upstream production process 306a or second upstream production process 306b as indicated by edges 304a-304b. In contrast, raw material from second raw material buffer 302b may be transported only to second upstream production process 306b as indicated by edge 304c. Raw materials from raw material buffer 302c may be transported to either second upstream production process 306b or third upstream production process 306c as indicated by edges 304d-304e. The results of processing the raw materials transported to upstream production processes 306a-306c is indicated by edges 308a-308e. Edges 308a-308e indicate that raw material transported from raw material buffers 302a-302c to each of upstream production processes 306a-306c is transformed into upstream intermediate items stored at upstream intermediate items buffers 310a-310d. Continuing with the exemplary tire manufacturer supply chain network example, these upstream intermediate items may represent different types of 'green tires.' Green tires comprise the blank tires which are placed into molds to cure and form a tread pattern determined by the mold.

As indicated by edges 308a-308e, each of the upstream production processes 306a-306c supplies upstream intermediate items to only particular upstream intermediate item buffers 310a-310d. For example, first upstream production process 306a supplies only first upstream intermediate item buffer 310a (indicated by edge 308a), while second upstream production process 306b may supply either first upstream intermediate item buffer 310a or second upstream intermediate item buffer 310b (indicated by edges 308b-308c). Neither first upstream production process 306a nor second upstream production process 306b may supply third upstream intermediate item buffer 310c or fourth upstream intermediate item buffer 310d (indicated by no edge connecting these buffers). Instead, third upstream production process 306c may supply either third upstream intermediate item buffer 310c or fourth upstream intermediate item buffer 310d (indicated by edges 308d-308e), but not first upstream intermediate item buffer 310a or second upstream intermediate item buffer 310b (indicated by no edge connecting these buffers).

These limitations on supplying upstream intermediate items to particular buffers may represent transportation limitations between upstream production processes 306a-

306c and intermediate item buffers 310a-310d. For example, first and second upstream production processes 306a-306b may be located in a first country, such as the United States, while third upstream production process 306c may be located in a second country, such as Spain. If first and second upstream intermediate item buffers 310a-310b are located in the United States and Canada, respectively, and third and fourth upstream intermediate item buffers 310c-310d are located in Spain and Germany, then the cost, time, available transportation options, or the like may limit the flow of items between one or more buffers of supply chain network model 300. Additionally, flow between the nodes may be limited by what items are produced from each of production processes 306a-306c. For example, production processes 306a-306c may comprise different production processes, which produce different items, each of which may be represented by a different SKU, and which each may be stored at different upstream intermediate item buffers 310a-310d. Although the limitation of the flow of items between nodes of supply chain network model 300 is described as cost, timing, transportation, or production limitations, embodiments contemplate any suitable flow of items or limitations of the flow of items between any one or more different nodes of a supply chain network, according to particular needs.

Next, the upstream intermediate items from upstream intermediate item buffers 310a-310d are further transported, as indicated by edges 312a-312i, to campaignable operations 314a-314c. Campaign operations 314a-314c are coupled by edges 316a-316c with campaignable resource 318 to indicate that campaignable operations 314a-314c require campaignable resource 318 in order to process the upstream intermediate items. According to embodiments, campaignable resource 318 comprises any resource which requires a significant amount of time to change from production of a first item to production of a second item (i.e. a changeover time). Campaignable resource 318 may include, for example, particular manufacturing, distribution, or transportation equipment and facilities, and other such resources utilized in the supply chain.

Continuing with the exemplary tire manufacturer supply chain network example, campaignable resource 318 may comprise the tire manufacturing equipment that is required for curing tires, but which may produce only one tire SKU at a time and which requires a significant change over time to switch between production of a first tire SKU to a second tire SKU. Therefore, solver 200 will use campaign planning to determine the order and length of time each campaignable operations 314a-314c should use campaignable resource 318. As described below, solver 200 will perform a campaign planning process to determine the allocation of the campaignable resource 318 based, in part, on upstream demands and capacity and material constraints. As indicated by edges 320a-320c, campaignable operations 314a-314c produce campaign goods stored at campaignable buffers 322a-322b, which, continuing with the example of the tire manufacturer supply chain network, may comprise cured tires which are ready for final processing before shipment to one or more customers or supply chain entities 150. For example, campaign goods from campaignable buffers 322a-322b may, as indicated by edges 324a-324d, be transported to final production processes 326a-326c. Final production processes 326a-336c transform the campaign goods as indicated by edges 328a-328d into finished goods stored at finished goods buffers 330a-330c. Final production processes 326a-326c may comprise one or more operations for finishing, testing, packaging, transportation, and the like of the campaign goods to produce finished goods held at finished goods buffers 330a-330c. Finished goods buffers 330a-330c comprise products ready to be packaged or transported to one or more customers, distribution centers, or stocking locations in supply chain network 100. For example, for the exemplary tire manufacturer, final production processes 326a-326c may comprise inspection, measurement, or testing of cured tires for compliance with tolerances or safety requirements. If the cured tires are compliant they may be marked for sale and transported to finished goods buffers 330a-330c for distribution to one or more customers or supply chain entities 150.

As indicated by edges 332a-332c, finished goods from finished goods buffers 330a-330c may be transported by transportation processes 334a-334c for distribution to satisfy demands 336a-336c of one or more customers and/or one or more supply chain entities 150. For the exemplary tire manufacturer supply chain network, transportation processes 334a-334c transport, package, or ship finished to one or more locations internal to or external of one or more supply chain entities 150 of supply chain network 100, including, for example, shipping tires directly to consumers, to regional or strategic distribution centers, or to the inventory of one or more supply chain entities 150, including, for example, to replenish a safety stock for one or more tires in an inventory of one or more supply chain entities 150. Although particular item and process described herein is a simplified description for the purpose of illustration. For example, the items may be different sizes, styles, states of same or different physical material. Similarly, a process may be any process or operation, including manufacturing, distribution, transportation, or any other suitable action of supply chain network 100. In one embodiment, additional constraints, such as, for example, business constraints, operation constraints, and resource constraints, may be added to facilitate other planning rules.

Although, a simplified supply chain network model 300 is shown and described as having a particular number of buffers, resources, and operations with a defined flow between them, embodiments contemplate any number of buffers, resources, and operations with any suitable flow between them, including any number of nodes and edges, according to particular needs. In particular, a supply chain master planning problem typically comprises a supply chain network much more complex than the simplified exemplary supply chain network model 300 described above. For example, a supply chain network often comprises multiple manufacturing plants located in different regions or countries. In addition, an item may be processed by many operations into a large number of different intermediate goods and/or finished items, where the different operations may have multiple constrained resources and multiple input items, each with their own lead, transportation, production, and cycle times. Additionally, material may flow bidirectionally (either, upstream or downstream), which is difficult to solve for heuristic solvers, but may, in some cases, be more quickly solved using LPOPT.

Supply chain network model 300 is used to generate a supply chain planning problem. As described in more detail below, during segmented supply chain planning, solver 200 generates three supply chain planning problems by selectively modifying different components of the supply chain planning problem.

Figure 4:
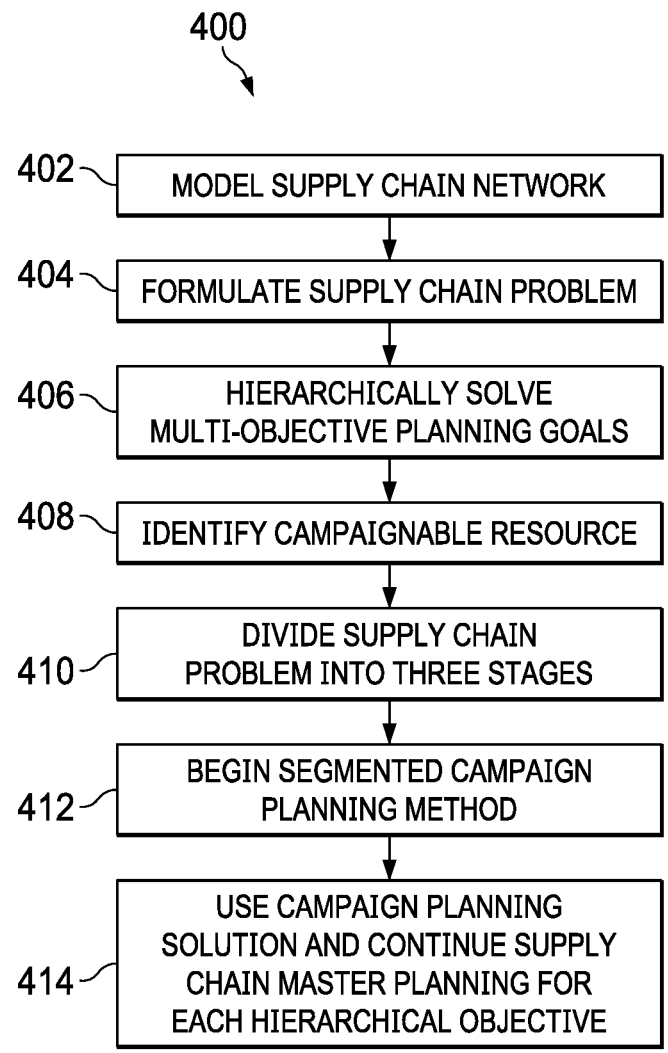
FIG. 4 illustrates components of a supply chain problem, which are modified during segmented campaign planning, according to an embodiment.

FIG. 4 illustrates components of a supply chain problem, which are modified during segmented campaign planning. A supply chain problem comprises segmented supply chain network model 400, campaign objectives 410, non-campaign objectives 412, and planning horizon 420. Segmented supply chain network model 400 comprises three segments 402-406. According to embodiments, segmented supply chain model 400 comprises upstream segment 402, campaign segment 404, and downstream segment 406. Upstream segment 402 comprises all buffers and processes upstream of campaignable operations 314a-314c, including raw material buffers 302a-302c, upstream production processes 306a-306c, upstream intermediate items buffers 310a-310d, and edges 304a-304e and 308a-308e. Campaign segment 404 comprises campaignable operations 314a-314c, campaignable resource 318, campaignable buffers 322a-322b, and edges 316a-316c and 320a-320c. As described above, campaignable operations 314a-314c (comprising, for example, a manufacturing process) require campaignable resource 318 (as indicated by edges 316a-316c) to produce campaign goods stored at campaignable buffers 322a-322b (as indicated by edges 320a-320c). Downstream segment 406 comprises all buffers and processes after campaignable buffers 322a-322b, including final production processes 326a-326c, finished goods buffers 330a-330c, transportation processes 334a-334c, demands 336a-336c, and edges 328a-328d and 332a-332c. For example, continuing with the exemplary tire manufacturer, upstream segment 402 comprises the portion of the supply chain responsible for green tire production. Campaign segment 404 comprises the curing process where the green tires are placed in molds to form the particular shape and tread of a particular tire represented by a particular SKU. Downstream segment 406 comprises compliance and safety testing, packaging, and shipment to one or more customer or supply chain entities 150 according to demands 336a-336c.

Like supply chain planning, campaign planning comprises modeling one or more objective functions (campaign objectives 410) and constraints (campaign constraints) and then solving the one or more campaign objectives 410, hierarchically, according to the one or more campaign constraints. Campaign constraints may comprise, for example, a maximum and/or minimum number of SKUs being produced a maximum and/or minimum number of changes from a previous bucket (i.e. minimize/maximize changeovers), minimum runtime, and the like, while respecting a set of hierarchical objectives. As described in more detail below, segmented campaign planning distinguishes between campaign objectives 410 and non-campaign objectives 412. Campaign objectives 410 are guiding objectives that are desired to be optimized while determining the campaign sequence. As an example only and not by way of limitation, campaign objectives 410 may comprise demand satisfaction, just-in-time production, alternate source minimization, and/or inventory reduction. In addition, non-campaign objectives 412 may comprise campaign objectives which are important, but which the campaign sequence is allowed to violate. As an example only and not by way of limitation, non-campaign objectives 412 may comprise outsourcing minimization, production smoothing, and the like.

Supply chain planning is performed over a time period divided into one or more time buckets. Planning horizon 420 comprises daily buckets 422, weekly buckets 424, and larger buckets 426. Larger buckets 426 may comprise, for example, monthly, quarterly, or any other bucket size larger than weekly buckets, including aggregated buckets formed from combining one or more buckets into larger buckets. Additionally, although buckets are described as comprising daily buckets 422, weekly buckets 424, and larger buckets 426, embodiments contemplate a planning horizon formed from any combination of one or more buckets of any suitable size. Continuing with the exemplary tire manufacturer, planning horizon 420 may comprise one year for supply chain planning. To generate accurate planning in the near term while speeding calculation of long term planning, daily buckets 422 may be used for the first one, two, three, or more weeks, followed by weekly buckets 424 for the near- to mid-term (such as, for example, the next one to three months following the daily buckets 422), and larger 426 buckets (such as monthly buckets) for the remainder of the planning horizon 420.

Figure 5:
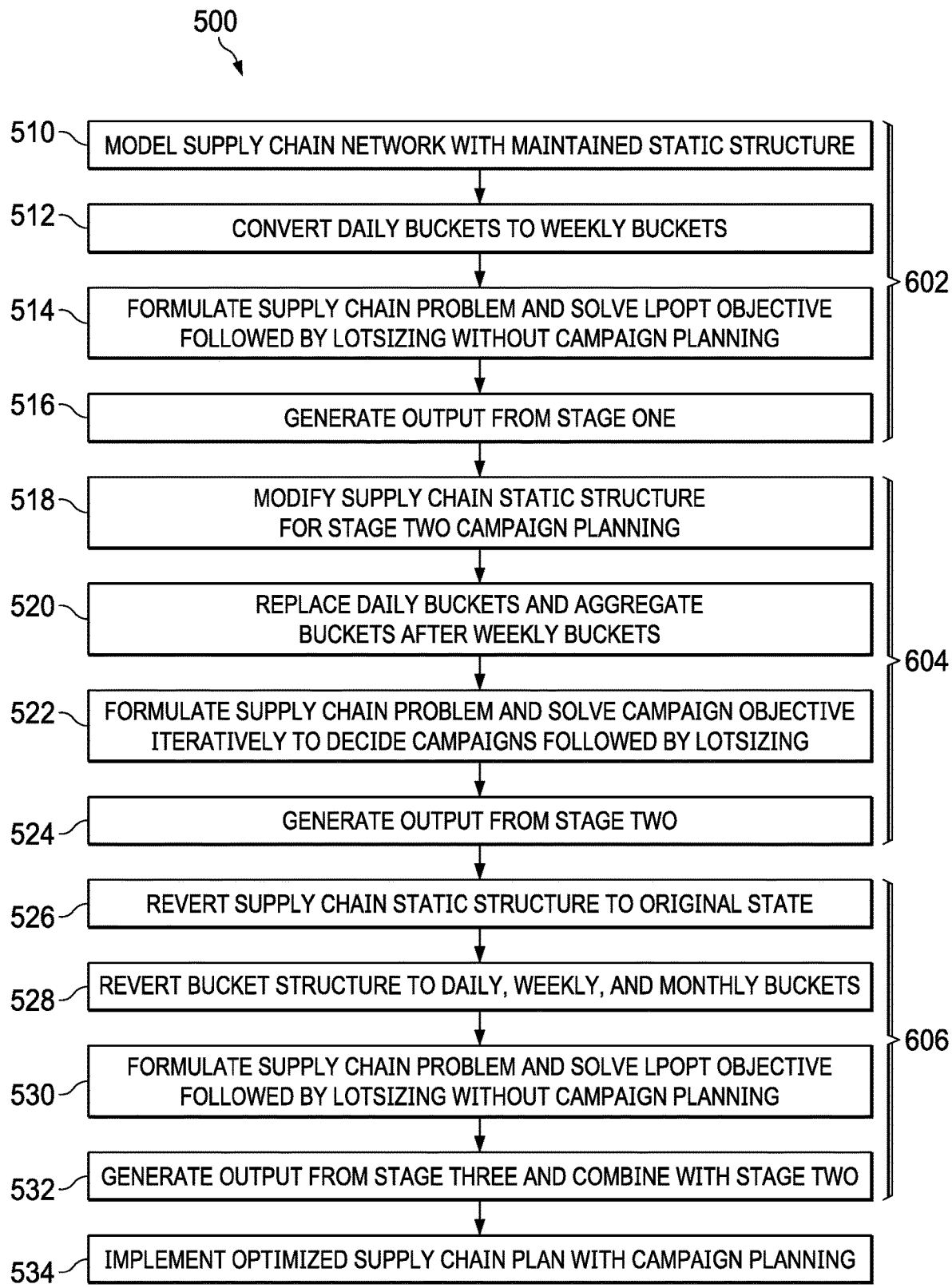
FIG. 5 illustrates an exemplary method of segmented campaign planning, according to an embodiment.

FIG. 5 illustrates an exemplary method 500 of segmented campaign planning, according to an embodiment. Segmented campaign planning comprises creating and solving a multi-objective hierarchical linear optimization using a segmented campaign planning process to quickly and optimally plan campaign planning objectives. According to embodiments, method 500 eliminates the problem of prohibitive runtimes in the presence of complex supply chains with fine-grained planning buckets, without diminishing the quality of the supply chain plan. Instead, method 500 may generate a near globally-optimal solution to a complex large-scale supply chain in presence of single-level campaign planning constructs.

As described below, method 500 formulates and solves a supply chain problem by segmenting the supply chain problem and solving three modified supply chain planning problems.

Figure 6:
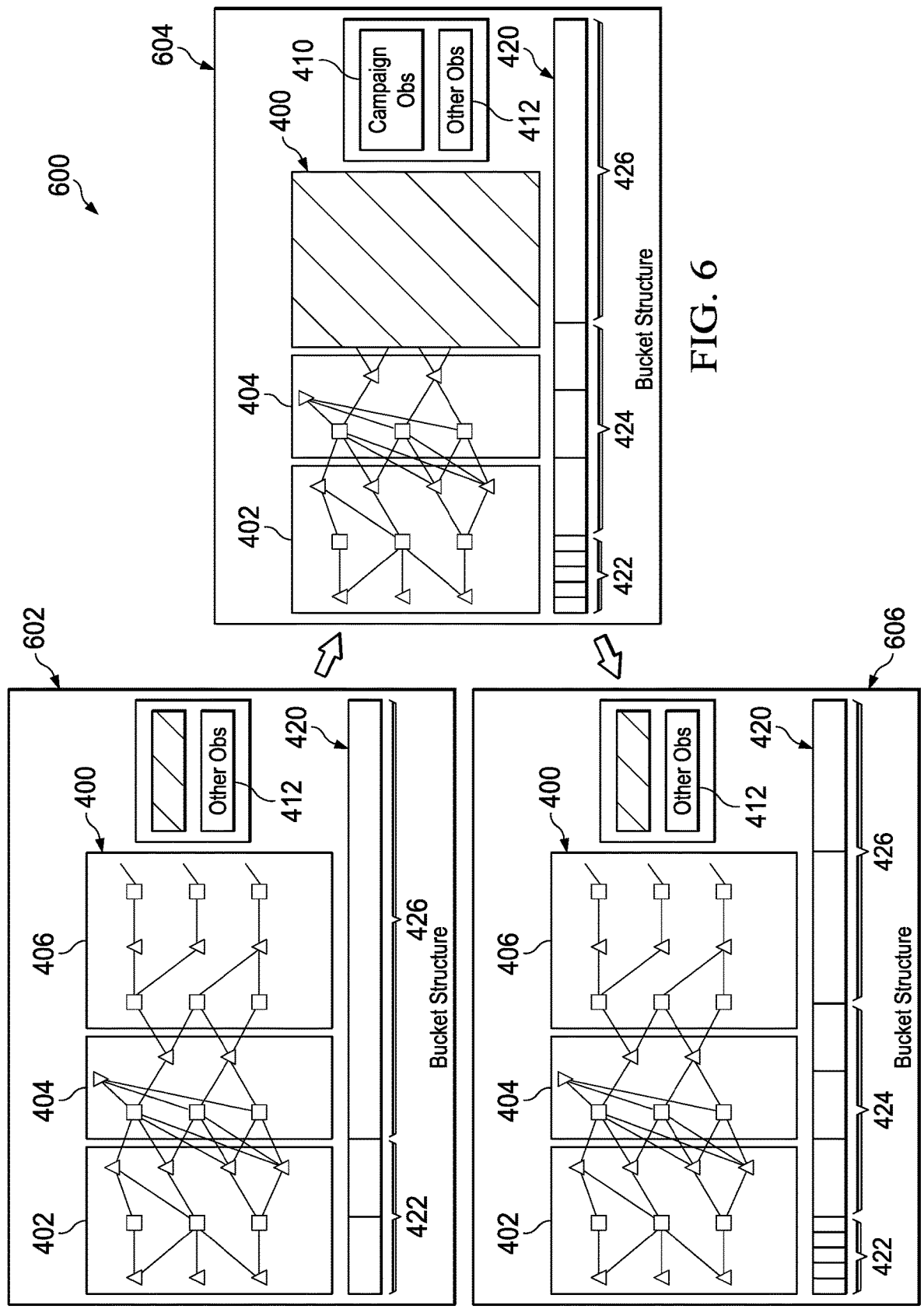
FIG. 6 illustrates segmented campaign planning stages according to an embodiment.

FIG. 6 illustrates segmented campaign planning stages 602-606, according to an embodiment. According to embodiments, segmented campaign planning comprises stage one 602, stage two 604, and stage three 604. Each stage 602-604 comprises a supply chain problem having a different combination of time-bucket granularity, supply chain static structure, and objectives. The solution from each of stages 602-606 is used to generate an output which is passed sequentially, from one stage to the next, to generate a near-optimal supply chain plan and campaign plan while simultaneously requiring a significantly smaller run time than an approach comprising a single globally-optimal LPOPT run with campaign planning. Each of three stages 602-606 may be run entirely in memory without exporting intermediate output to a database, which improves performance of method 500 of segmented campaign planning process.

Method 500 proceeds by one or more activities organized into three stages 602-606, which although described in a particular order and associated with a particular stage 602-606, may be performed in one or more permutations associated with or without any of stage 602-606, according to particular needs.

Method 500 begins at activity 510 of stage one 602, where solver 200 models supply chain network 100 based on the static structure of the supply chain. Supply chain network 100 may comprise an initial static structure, received by solver 200. According to embodiments, solver 200 keeps the overall static structure intact when modeling supply chain network 100 during stage one 602. However, as described in more detail below, the static structure of the supply chain represented by the supply chain network model is modified during stage two 604 and reverted back to the initial static structure during stage three 606.

At action 512 of stage one 602, solver 200 converts daily buckets to weekly buckets. As discussed above, supply chain planning horizon 520 comprises a bucketization scheme having daily buckets 422, weekly buckets 424, monthly buckets, and/or one or more larger buckets 426. For example, planning horizon 420 may comprise daily buckets 422 for near-term planning periods (up to, for example, about 40 days), followed by weekly buckets 424 for mid-term planning, then larger buckets 426 (such as, monthly, quarterly, or aggregated buckets) through the end of the planning period. According to embodiments, any daily buckets 422 used in planning prior to campaign segment 404 are converted into weekly buckets 424. Any weekly buckets 424 are kept as weekly buckets 424, while monthly buckets may be limited in quantity to a preselected parameter, such as, for example 9 months and any remaining buckets may be aggregated into a single larger bucket 426 comprising an aggregated bucket.

At action 514 of stage one 602, solver 200 formulates the supply chain problem and solves the LPOPT objective followed by lotsizing without campaign planning. Using the weekly buckets 424 and larger buckets 426, solver 200 removes campaignable objectives 410, and solves for demands using only non-campaign objectives 512. According to embodiments, lotsizing options are provided in an LPOPT option file for lot size planning. In addition, or as an alternative, converting the daily buckets to weekly buckets reduces the overall complexity of the supply chain solve due to the reduced number of buckets and providing more flexibility to the solver 200 to utilize material and capacity at the campaign stage.

At action 516 of stage one 602, solver 200 generates output from stage one 602 comprising a log file having prioritized production demand on campaignable buffers in the temporary model. Before importing the log in solver 200, the log is stored in the temporary model. According to embodiments, the output of stage one 602 may be stored in a temporary user-defined model to improve performance. The log comprises information about partitions of each operation plan so that each part may be assigned to a specific demand to preserve the demand priority on the campaignable operation plans.

Stage two 604 of method 500 begins at action 518, where solver 200 modifies the static structure of the supply chain model. Based on the output from stage one 602, solver 200 generates a prioritized production requirement for campaign segment 404. According to embodiments, solver 200 creates additional demands (dummy demands) on campaignable buffers 314a-314c. While production plans were created in weekly buckets in stage one 602, corresponding dummy demands are placed on the last daily bucket corresponding to the week, in stage two 604. Placing the demand on the last day of the week allows for even distribution of demands across the week, as solver 200 can always plan the production earlier based on material availability. Further, solver 200 temporarily eliminates all buffers, flows, and operations downstream of campaignable buffers 314a-314c by marking each as lp_pass=false to indicate like-wise to the solver 200. Additionally, the actual item requests for Finished Goods are marked as lp_pass=false so that the item requests are not considered for planning in LPOPT. Further, any WIP/fixed flows that are defined downstream of campaignable buffers 314a-314c are also marked as lp_pass=false.

At activity 520 of stage two 604, solver 200 replaces daily buckets 422 and aggregate buckets after weekly buckets 424. Additionally, solver 200 manipulates the time bucket structure to enable near term daily buckets 422 which are relevant to the campaign resource while also creating one or more larger buckets 426 comprising aggregated buckets to generate sufficient demand for campaign planning. For example, according to embodiments, frozen daily buckets 422 are followed by campaignable daily buckets 422. Weekly buckets 424 are added to cover the demands on campaignable buffers 314a-314c calculated during stage one 602. The remaining buckets are aggregated into one larger bucket 426 comprising an aggregated bucket.

At activity 522 of stage two 606, solver 200 formulates the supply chain problem and solves campaign objective iteratively to decide campaigns and followed by lotsizing. For example, solver 200 selectively enables the campaign planning objectives 510 (which were disabled at the first planning stage) and performs campaign planning on daily buckets using LPOPT by calculating campaign planning for campaignable buffers 314a-314c using breakout information from first stage campaign planning problem and without using information from downstream segment 406 of the supply chain plan. By eliminating downstream segment 406 from the second campaign planning problem, solver 200 may now use any LPOPT options for campaign planning, with the exception of regular lotsizing options.

At activity 524 of stage two 606, solver 200 generates the output from stage two as a campaign plan at the producing operations of campaignable buffers 314a-314c.

Stage three 606 of method 500 begins at action 526, where solver 200 reverts the supply chain static structure of the supply chain model back to the original state. For example, downstream segment 406 of supply chain network 100 is re-enabled by setting to lp_pass=true all buffers, flows, and operations downstream of campaignable buffers 314a-314c. The actual Finished Goods Demands are also marked as lp_pass=true so that it is considered for planning in LPOPT. The WIP/fixed flows which are defined downstream of campaignable buffers 314a-314c are also marked as LP pass true.

At activity 528 of stage three 606, solver 200 reverts the bucket structure to daily, weekly, and monthly buckets. Additionally, the time buckets are restored to the original requirements of the supply chain planning problem, and dummy demands and dummy delivery operations created during stage two 604 for campaignable buffers 314a-314c are removed. Further, the producing operations on campaignable buffers 314a-314c in the campaignable period which are not part of the output of stage two 604 are switched off so that campaign planning during stage three 606 does not plan anything on these operations.

At activity 530 of stage three 606, solver 200 formulates the supply chain problem and solves the LPOPT objective followed by lotsizing without campaign planning. Further, campaign-specific objective levels 410 are removed and replaced with the original non-campaign objective levels 412. Because the stage three 606 planning problem begins with a solved campaign plan, solver 200 may satisfy demands only by adding articles to an existing campaign, not by adding a new campaign or deleting an existing campaign. At this point, the LPOPT option file will now have all the LPOPT options for regular lotsizing options.

At activity 532 of stage three 606, solver 200 generates the output from state three 606 comprising a supply chain plan and combines it with the output of stage two 604 comprising a campaign plan to generate an overall optimized supply chain plan including a campaign plan.

After stage three 606 ends at activity 532, method 500 may continue to activity 534, where solver 200 uses the supply chain plan and campaign plan generated by segmented campaign planning to instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities, and the configuration and quantity of packaging and shipping of items based on a supply chain plan, including a supply chain master plan and/or a campaign plan, the number of items currently in the inventory one or more supply chain entities 150, the number of items currently in transit in the transportation network 140, forecasted demand, a supply chain disruption, and/or one or more other factors described herein It should be noted that the item and process described herein is a simplified description for the purpose of illustration. For example, the items may be different sizes, styles, states of same or different physical material. Similarly, a process may be any process or operation, including manufacturing, distribution, transportation, or any other suitable action of supply chain network 100. In one embodiment, additional constraints, such as, for example, business constraints, operation constraints, and resource constraints, may be added to facilitate other planning rules. The business objectives are prioritized and modeled as hierarchy of objective functions. This model is a linear programming (LP) problem which does not consider discrete variables or constraints. For the sake of simplicity, and without loss of generality, all the objective functions are assumed to be minimized. If any objective function is to be maximized, the objective function is negated and minimized.

As explained above, the segmented campaign planning process comprises modifying supply chain models, objectives, and buckets to create less complex campaign planning problems, which may be solved more quickly using less computing resources than a single segment campaign planning problem, while still generating plans of equivalent or satisfactory quality. By segmenting the campaign planning process as described above, this change, the runtime of the workflow of campaign planning was drastically reduced (e.g. from 120 hours to 25 hours), and all the campaign planning constraints and business objectives were respected which ensured better overall plan quality. In contrast, a single stage campaign planning problem is infeasible for large datasets because the high complexity of campaign planning problems, which means that, even with a large amount of computer resources, the problem may take over 120 hours to solve, which limits the usefulness of the solution, since it may already be stale by the time it is generated.

FIG. 7 illustrates a comparison of results for single stage campaign planning and segmented campaign planning for a small production dataset. A small dataset may comprise a portion of a supply chain network required to produce one or two finished goods and/or one or two manufacturing plants. Chart 700 illustrates for each of the solved objective levels, the segmented stage process generated a supply chain master plan with results the same or equivalent to that produced by the single stage process, including satisfying the same amount of demand, having the same lateness for backlogged items, and a build ahead and manufacturing quantity with equivalent results. This indicates for small datasets segmented campaign planning produces high-quality supply chain master plans. In addition to generating high-quality plan for a small dataset, segmented campaign planning also generates high-quality plans for large datasets.

FIG. 8 illustrates a comparison of results for single stage campaign planning and segmented campaign planning for a large production dataset. A large production dataset may comprise, for example, a supply chain problem comprising a larger portion (or the entirety) of a supply chain network 100. For example, the large production dataset used in the above comparison comprises approximately 6000 finished goods, nineteen manufacturing plants, a global supply chain with global demands, and a worldwide distribution network. As illustrated, in one-year supply chain master planning using the segmented campaign planning process, the demand satisfaction was similar to the result from supply chain master planning using a single campaign planning problem, even though the segmented campaign planning used much less memory and took approximately 118 hours less to complete. Because segmented campaign planning can be accomplished in one or two days, this allows campaign planning to be run on weekends as part of a master planning solution, which means the campaign plan may be distributed weekly to individual factories for implementation.

Chart 800 comprises a comparison of demand fulfillment sorted according to demand layers. The total demand for the exemplary large production dataset comprises 174,000 items, prioritized by fourteen different layers. Each layer represents demand having a particular priority, sorted from a highest priority demand at Layer0 descending to a lowest priority demand at layer 13. During LP solving, Solver 200 may solve each layer one at a time, hierarchically, before moving to a lower priority layer. According to embodiments, demands are prioritized based on the importance of the customer and the time value of the finished goods. A highest priority demand might comprise, for example, a high value good requested by a high priority customer which if not immediately fulfilled will be lated. According to embodiments, Solver 200 may solve the supply chain master planning problem to try to first meet the highest priority demand (demand for Layer0) before solving the supply chain master planning problem to satisfy the next lower priority demand (demand for Layer1). In this manner, solver 200 may iteratively solve supply chain master planning problem for the demand of each layer, one layer at a time, in order of priority, until material or capacity is exhausted, or all demand layers are processed. Although the exemplary large production dataset comprises three levels of customer importance and three values of finished goods, embodiments contemplate any number of priority levels associated with demands, goods, customers, brand value, customer segmentation, priority of finished good, priority of customer demand, and the like, according to particular needs.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
   a supply chain network comprising a robotic inventory system and a production line comprising automated robotic production machinery, wherein the robotic inventory system is configured to adjust inventory levels and the production line is configured to produce one or more products using one or more campaign operations and one or more campaignable resources;
   a network interconnecting the production line, a planner and the robotic inventory system;

the planner, further comprising a processor and a non-transitory computer-readable storage medium, the planner configured to:
  model the supply chain network over a planning horizon, the planning horizon comprising one or more time buckets;
  formulate a supply chain master planning problem comprising a hierarchy of objective functions and one or more constraints, wherein each objective function of the hierarchy of objective functions is expressed as a minimization;
  identify one or more campaignable buffers and one or more campaignable resources;
  divide the supply chain master planning problem into a first segment comprising one or more items and operations upstream of the one or more campaignable buffers, a second segment comprising the one or more campaignable buffers and the one or more campaignable resources, and a third segment comprising one or more items and operations downstream of the one or more campaignable resources and the one or more campaignable buffers;
  modeling one or more campaign objective functions specific to a campaign planning solution;
  segment a campaign planning problem into three stages, wherein each stage comprises a supply chain problem with a different combination of time-bucket granularity, supply chain static structure and objectives;
  solve a campaign planning problem of a first stage of the three stages to determine prioritized production demands on the one or more campaignable buffers;
  solve a campaign planning problem of a second stage of the three stages to determine a timing and a sequence for allocating the one or more campaignable resources to the one or more campaignable buffers that satisfies, at least in part, the prioritized production demands;
  solve a campaign planning problem of a third stage of the three stages to determine a quantity of one or more products to produce on at least one of the one or more campaignable resources during the timing allocated to the at least one of the one or more campaignable resources by solving the campaign planning problem of the second stage and that satisfies, at least in part, the prioritized production demands;
  instruct the robotic inventory system to adjust inventory levels at various stocking points determined by the solution of the campaign planning problem of the third stage; and
  instruct the production line to produce the one or more products using the at least one of the one or more campaignable resources and according to the quantity determined by the solution of the campaign planning problem of the third stage.

2. The system of claim 1, wherein the planner is further configured to:
  prior to solving the campaign planning problem of the second stage, remove buffers, flows, and demands downstream of the one or more campaignable buffers from the campaign planning problem.

3. The system of claim 2, wherein the planner is further configured to:
  prior to solving the campaign planning problem of the first stage, convert any daily buckets of the planning horizon to weekly buckets and remove the one or more campaign objective functions from the campaign planning problem.

4. The system of claim 3, wherein the planner is further configured to:
  prior to solving the campaign planning problem of the third stage, re-enable the buffers, the flows, and the demand downstream of the one or more campaignable buffers to the campaign planning problem.

5. The system of claim 4, wherein the planner is further configured to:
  iteratively solve one or more objective functions of the hierarchy of objective functions.

6. The system of claim 5, wherein the one or more objective functions model one or more business objectives comprising one or more of business rules, campaign data, planning requirements, scheduling constraints, discrete constraints, sequence dependent setup times, lot-sizing, storage constraints, and shelf-life constraints.

7. A method, comprising:
  providing a supply chain network comprising a robotic inventory system and a production line comprising automated robotic production machinery, wherein the robotic inventory system is configured to adjust inventory levels and the production line is configured to produce one or more products using one or more campaign operations and one or more campaignable resources;
  interconnecting via a network the production line, a planner and the robotic inventory system;
  modeling, by the planner comprising a processor and a non-transitory computer-readable storage medium, the supply chain network over a planning horizon, the planning horizon comprising one or more time buckets;
  formulating, by the planner, a supply chain master planning problem comprising a hierarchy of objective functions and one or more constraints, wherein each objective function of the hierarchy of objective functions is expressed as a minimization;
  identifying, by the planner, one or more campaignable buffers and one or more campaignable resources;
  dividing, by the planner, the supply chain master planning problem into a first segment comprising one or more items and operations upstream of the one or more campaignable buffers, a second segment comprising the one or more campaignable buffers and the one or more campaignable resources, and a third segment comprising one or more items and operations downstream of the one or more campaignable resources and the one or more campaignable buffers;
  modeling, by the planner, one or more campaign objective functions specific to a campaign planning solution;
  segmenting, by the planner, a campaign planning problem into three stages, wherein each stage comprises a supply chain problem with a different combination of time-bucket granularity, supply chain static structure and objectives;
  solving, by the planner, a campaign planning problem of a first stage of the three stages to determine prioritized production demands on the one or more campaignable buffers;
  solving, by the planner, a campaign planning problem of a second stage of the three stages to determine a timing and a sequence for allocating the one or more campaignable resources to the one or more campaignable buffers that satisfies, at least in part, the prioritized production demands;

solving, by the planner, a campaign planning problem of a third stage of the three stages to determine a quantity of one or more products to produce on at least one of the one or more campaignable resources during the timing allocated to the at least one of the one or more campaignable resources by solving the campaign planning problem of the second stage and that satisfies, at least in part, the prioritized production demands;

instructing, by the planner, the robotic inventory system to adjust inventory levels at various stocking points determined by the solution of the campaign planning problem of the third stage; and instructing, by the planner, the production line to produce the one or more products using the at least one of the one or more campaignable resources and according to the quantity determined by the solution of the campaign planning problem of the third stage.

8. The method of claim 7, further comprising:
removing, by the planner, buffers, flows, and demands downstream of the one or more campaignable buffers from the campaign planning problem prior to solving the campaign planning problem of the second stage.

9. The method of claim 8, further comprising:
prior to solving the campaign planning problem of the first stage, converting, by the planner, any daily buckets of the planning horizon to weekly buckets and removing, by the planner, the one or more campaign objective functions from the campaign planning problem.

10. The method of claim 9, further comprising:
re-enabling, by the planner, the buffers, the flows, and the demand downstream of the one or more campaignable buffers to the campaign planning problem prior to solving the campaign planning problem of the third stage.

11. The method of claim 10, further comprising:
iteratively solving, by the planner, one or more objective functions of the hierarchy of objective functions.

12. The method of claim 11, wherein the one or more objective functions model one or more business objectives comprising one or more of business rules, campaign data, planning requirements, scheduling constraints, discrete constraints, sequence dependent setup times, lot-sizing, storage constraints, and shelf-life constraints.

13. A non-transitory computer-readable medium embodied with software, the software when executed configured to:
interconnect via a network, a supply chain network comprising a robotic inventory system, a production line comprising automated production machinery and a planner, wherein the robotic inventory system is configured to adjust inventory levels, the production line is configured to produce one or more products using one or more campaign operations and one or more campaignable resources and the planner comprises a processor and memory;

model the supply chain network over a planning horizon, the planning horizon comprising one or more time buckets;

formulate a supply chain master planning problem comprising a hierarchy of objective functions and one or more constraints, wherein each objective function of the hierarchy of objective functions is expressed as a minimization;

identify one or more campaignable buffers and one or more campaignable resources;

divide the supply chain master planning problem into a first segment comprising one or more items and operations upstream of the one or more campaignable buffers, a second segment comprising the one or more campaignable buffers and the one or more campaignable resources, and a third segment comprising one or more items and operations downstream of the one or more Amendment campaignable resources and the one or more campaignable buffers;

model one or more campaign objective functions specific to a campaign planning solution;

segment a campaign planning problem into three stages, wherein each stage comprises a supply chain problem with a different combination of time-bucket granularity, supply chain static structure and objectives;

solve a campaign planning problem of a first stage of the three stages to determine prioritized production demands on the one or more campaignable buffers;

solve a campaign planning problem of a second stage of the three stages to determine a timing and a sequence for allocating the one or more campaignable resources to the one or more campaignable buffers that satisfies, at least in part, the prioritized production demands;

solve a campaign planning problem of a third stage of the three stages to determine a quantity of one or more products to produce on at least one of the one or more campaignable resources during the timing allocated to the at least one of the one or more campaignable resources by solving the campaign planning problem of the second stage and that satisfies, at least in part, the prioritized production demands;

instruct the robotic inventory system to adjust inventory levels at various stocking points determined by the solution of the campaign planning problem of the third stage; and instruct the production line to produce the one or more products using the at least one of the one or more campaignable resources and according to the quantity determined by the solution of the campaign planning problem of the third stage.

14. The non-transitory computer-readable medium of claim 13, the software when executed further configured to:
remove buffers, flows, and demands downstream of the one or more campaignable buffers from the campaign planning problem prior to solving the campaign planning problem of the second stage.

15. The non-transitory computer-readable medium of claim 14, the software when executed further configured to:
prior to solving the campaign planning problem of the first stage, convert any daily buckets of the planning horizon to weekly buckets and removing, by the planner, the one or more campaign objective functions from the campaign planning problem.

16. The non-transitory computer-readable medium of claim 15, the software when executed further configured to:
re-enable the buffers, the flows, and the demand downstream of the one or more campaignable buffers to the campaign planning problem prior to solving the campaign planning problem of the third stage.

17. The non-transitory computer-readable medium of claim 16, the software when executed further configured to:
iteratively solving, by the planner, one or more objective functions of the hierarchy of objective functions.

18. The non-transitory computer-readable medium of claim 17, wherein the one or more objective functions model one or more business objectives comprising one or more of business rules, campaign data, planning requirements, scheduling constraints, discrete constraints, sequence dependent setup times, lot-sizing, storage constraints, and shelf-life constraints.

* * * * *